(12) United States Patent
Shahana et al.

(10) Patent No.: US 7,166,048 B2
(45) Date of Patent: Jan. 23, 2007

(54) BICYCLE DERAILLEUR WITH PROTECTIVE SUPPORT

(75) Inventors: Satoshi Shahana, Osaka (JP); Masayuki Arakawa, Sakai (JP); Nobukatsu Hara, Izumisano (JP); Shinya Oseto, Sakai (JP)

(73) Assignee: Shimano, Inc., Sakai (JP)

( * ) Notice: Subject to any disclaimer, the term of this patent is extended or adjusted under 35 U.S.C. 154(b) by 223 days.

(21) Appl. No.: 10/605,831

(22) Filed: Oct. 29, 2003

(65) Prior Publication Data
US 2004/0110586 A1 Jun. 10, 2004

(30) Foreign Application Priority Data
Oct. 30, 2002 (JP) ............................. 2002-316149

(51) Int. Cl.
*F16H 9/00* (2006.01)

(52) U.S. Cl. ...................................... 474/82

(58) Field of Classification Search ................. 474/78, 474/79, 80, 81, 82, 83, 144; 280/260
See application file for complete search history.

(56) References Cited

U.S. PATENT DOCUMENTS

| | | | | | |
|---|---|---|---|---|---|
| 3,184,993 | A | * | 5/1965 | Swenson | .................... 474/144 |
| 4,215,872 | A | * | 8/1980 | Clark | ......................... 280/236 |
| 4,286,953 | A | * | 9/1981 | Shimano | ...................... 474/80 |
| RE32,924 | E | * | 5/1989 | Nagano | ....................... 474/82 |
| 5,919,106 | A | | 7/1999 | Ichida | |
| 5,931,753 | A | | 8/1999 | Ichida | |
| 6,287,228 | B1 | | 9/2001 | Ichida | |
| 2004/0110587 | A1 | * | 6/2004 | Shahana et al. | .............. 474/80 |
| 2004/0254038 | A1 | | 12/2004 | Chamberlain et al. | ...... 474/144 |

FOREIGN PATENT DOCUMENTS

EP 32049 A2 7/1981

\* cited by examiner

*Primary Examiner*—Vicky A. Johnson
(74) *Attorney, Agent, or Firm*—James A. Deland

(57) ABSTRACT

A bicycle derailleur comprises a bracket adapted to be mounted to the frame; a base member supported by the bracket; a chain guide; and a coupling mechanism coupled between the base member and the chain guide so that the chain guide moves relative to the base member. The base member is supported at first and second lateral locations, wherein the bracket supports at least one of the first and second lateral locations of the base member.

39 Claims, 11 Drawing Sheets

US 7,166,048 B2

BICYCLE DERAILLEUR WITH PROTECTIVE SUPPORT

BACKGROUND OF INVENTION

The present invention is directed to bicycles and, more particularly, to a bicycle derailleur with a protective support.

A bicycle rear derailleur engages a driving chain on one of a plurality of sprockets mounted on the rear wheel hub. A conventional derailleur comprises a base member detachably fastened to the back end the frame, a chain guide for guiding the chain onto the plurality of sprockets, a movable member that pivotably supports the chain guide, and a link mechanism that movably supports the movable member relative to the base member. Such a derailleur is shown in Japanese Unexamined Patent Application No. 11-263282, for example.

Rear dropout portions are formed at the back end of the frame for installing the rear wheel hub. The base member may be supported on the frame in a cantilevered manner by screwing a bolt into a threaded opening formed below the hub mounting section of one of the frame dropout portions. Accordingly, the base member projects laterally outwardly from the frame. As used herein, the words "lateral" and "laterally" are to be interpreted according to the left and right directions in FIG. 4 (i.e., inward/outward from the side of the bicycle). The chain guide has a pair of vertically aligned pulleys that guide the chain onto one of the plurality of sprockets, wherein the chain guide is pivotably coupled to the moveable member so that the chain guide pivots around an axis that is substantially parallel to the hub axle. The chain guide is biased relative to the movable member in a direction that produces tension on the chain (typically clockwise when viewed laterally outwardly from the derailleur). The link mechanism may comprise a four-point link mechanism having a pair of links that move the movable member in the direction of the hub axle and diametrically outwardly as the chain guide moves closer to the sprockets. The inner cable of a Bowden cable assembly is fastened to the link mechanism such that pulling or releasing the inner cable using a shifter disposed on the handlebar causes the link mechanism to move the movable member and chain guide to engage the chain with a desired sprocket.

Since the laterally outwardly projecting derailleur is supported in a cantilevered manner at the back end of the frame, the base member and/or chain guide can bump into rocks, trees or the like when traveling over rough terrain such as mountainous terrain. This can cause the frame mounted components such as the base member to become bent or damaged, thus adversely affecting the operation of the derailleur.

SUMMARY OF INVENTION

The present invention is directed to various features of a bicycle derailleur. In one embodiment, a bicycle derailleur comprises a bracket adapted to be mounted to the frame; a base member supported by the bracket; a chain guide; and a coupling mechanism coupled between the base member and the chain guide so that the chain guide moves relative to the base member. The base member is supported at first and second lateral locations, wherein the bracket supports at least one of the first and second lateral locations of the base member. Additional inventive features will become apparent from the description below, and such features alone or in combination with the above features may form the basis of further inventions as recited in the claims and their equivalents.

DETAILED DESCRIPTION

Figure 1:
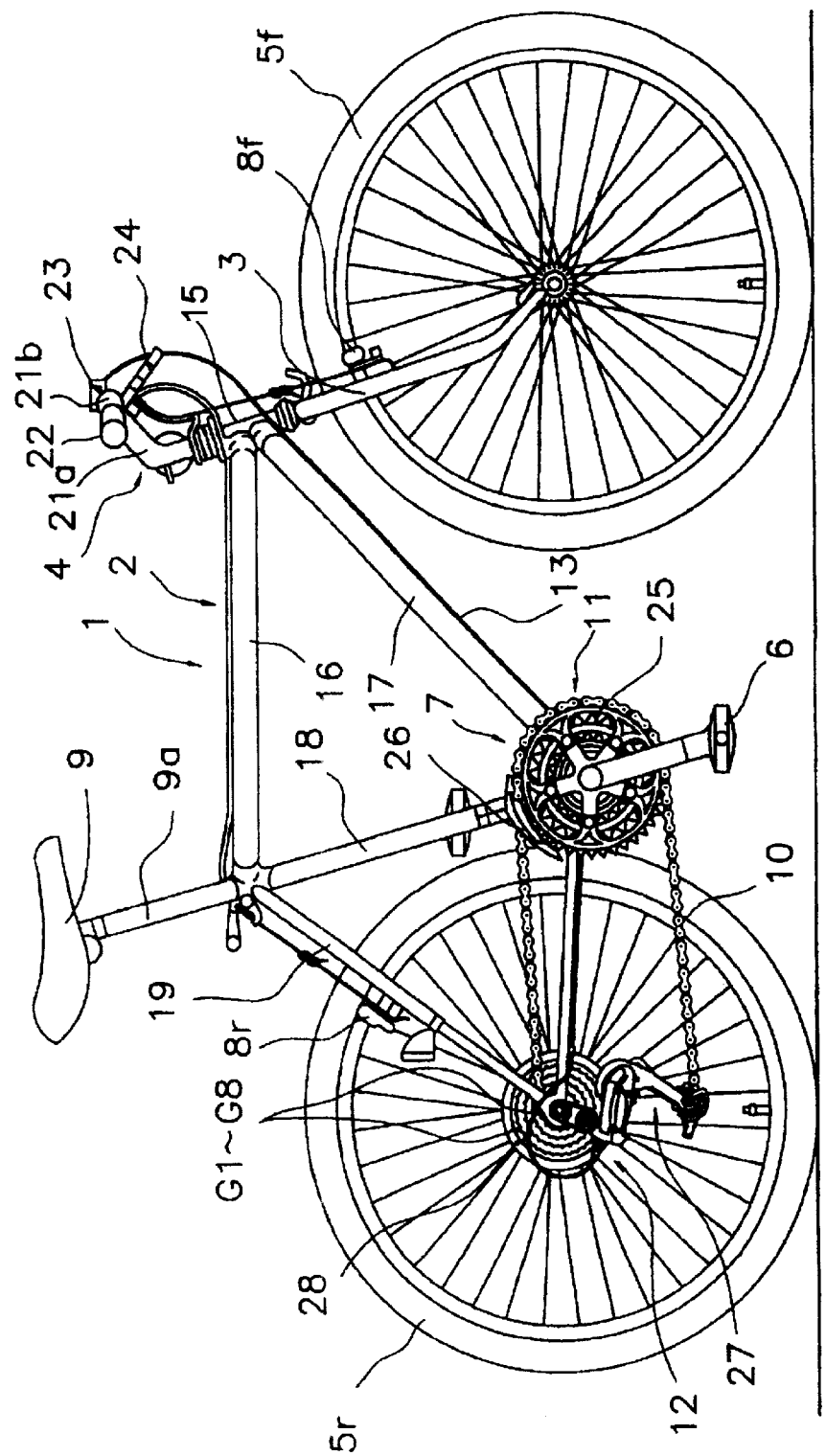
FIG. 1 is a side view of a particular embodiment of a bicycle.

FIG. 1 is a side view of a particular embodiment of a bicycle 1. Bicycle 1 includes a diamond-shaped frame body 2, a front fork 3, a handlebar unit 4, a front wheel 5f, a rear wheel 5r, a drive unit 7 for transferring rotation of pedals 6 to rear wheel 5r, a front brake unit 8f and a rear brake unit 8r.

Frame body 2 comprises front and rear triangular portions, wherein front triangular portion comprises a head tube 15, a top tube 16, a down tube 17, and a seat tube 18. Fork 3 is mounted to head tube 15 for rotation around an inclined axis. Handlebar unit 4 is mounted to the upper portion of fork 3, and front wheel 5f is rotatably mounted to the lower portion of fork 3. Handlebar unit 4 comprises a handle stem 21a and a handlebar 21b mounted to the top of handlebar stem 21a, wherein handle stem 21a is mounted to the top of front fork 3. Handlebar 21b is equipped with a pair of left and right grips 22, a pair of left and right shift control units 23, and a pair of left and right brake controllers 24. A vertically adjustable seat post 9a with a saddle 9 mounted thereon is mounted in the upper portion of seat tube 18, and a forward portion of drive unit 7 is rotatably mounted at the lower portion of seat tube 18.

Figure 3:
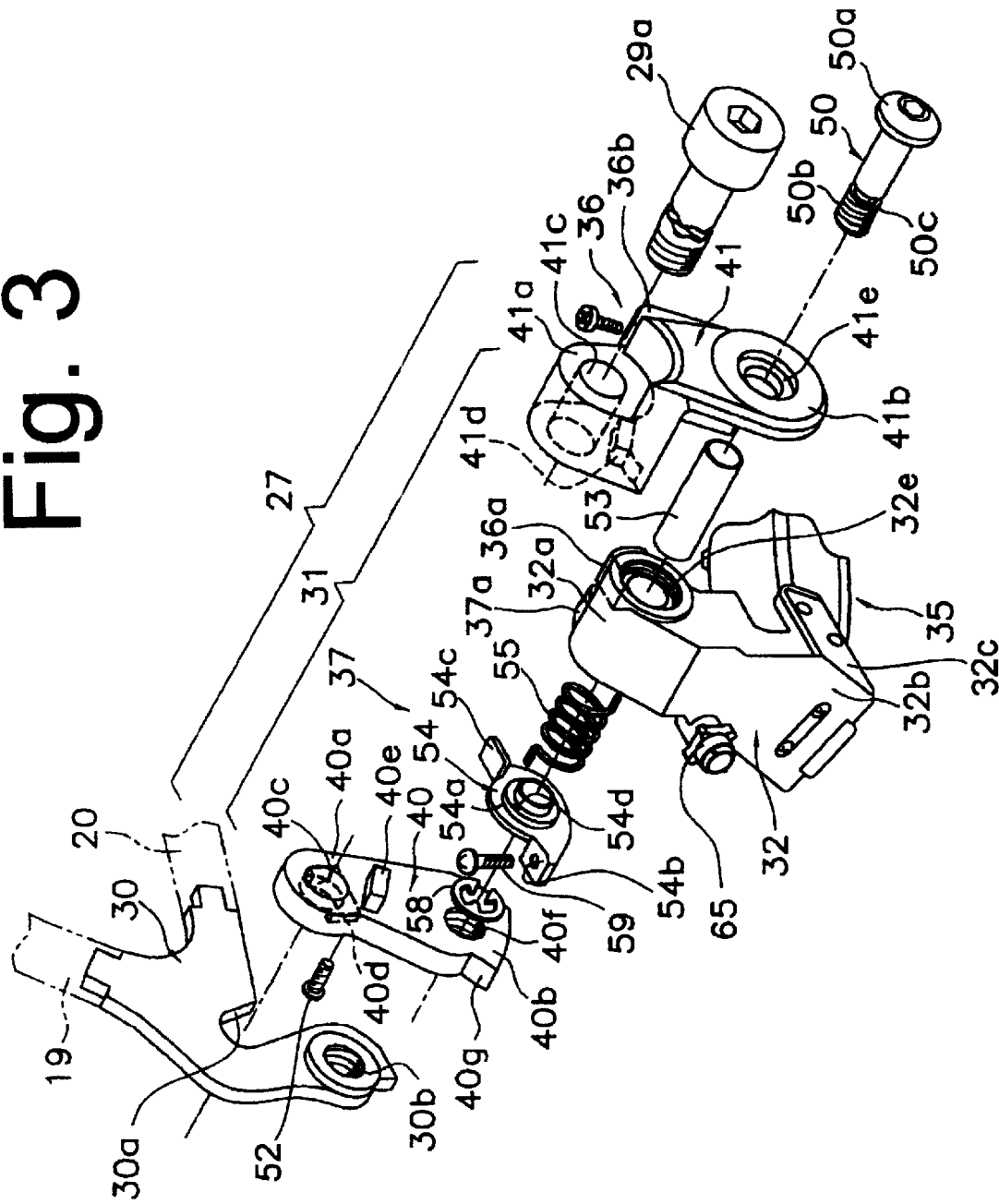
FIG. 3 is an exploded view of relevant components of the rear derailleur near the base member of the derailleur.
Figure 4:
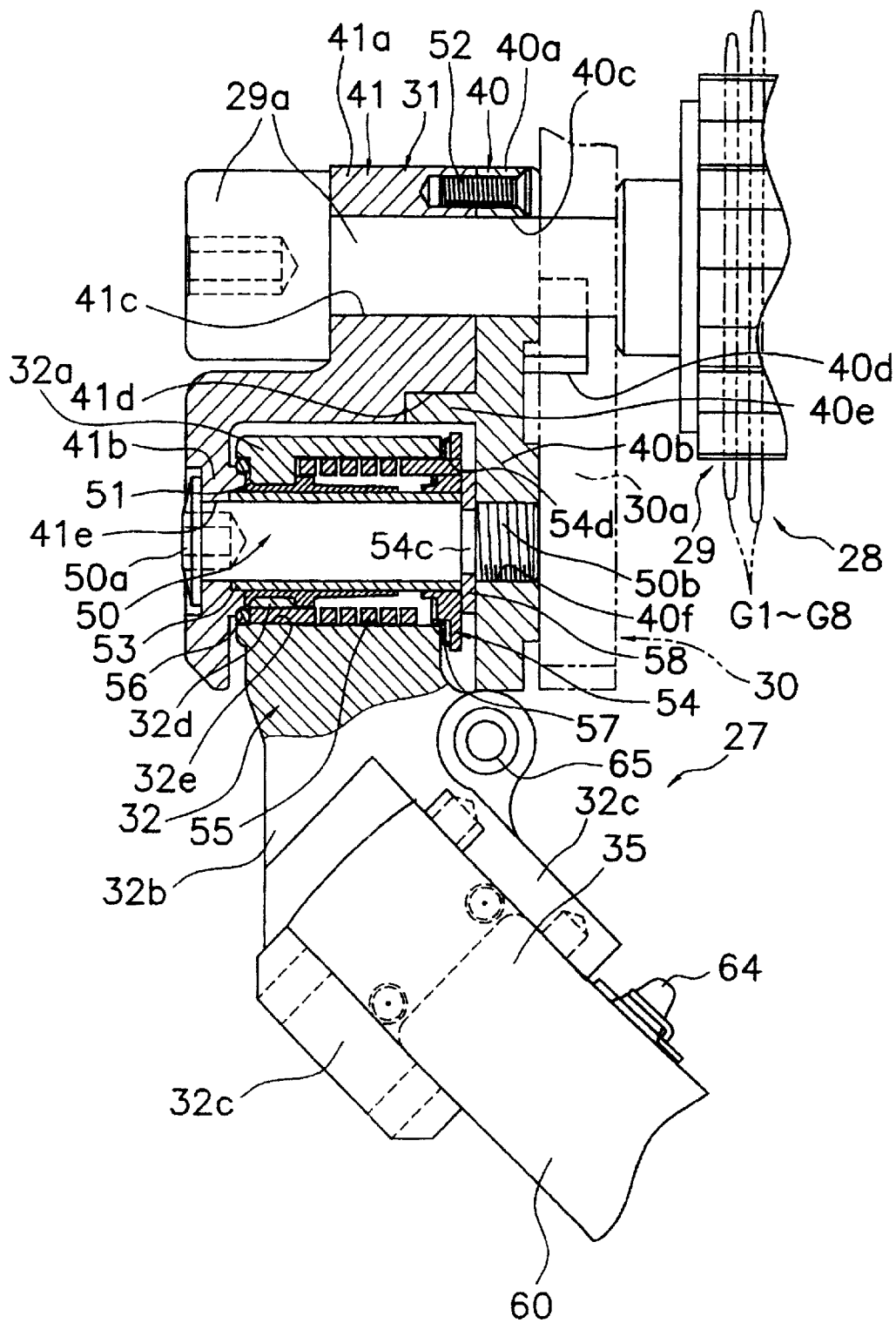
FIG. 4 is a partial cross sectional view of the components near the base member of the rear derailleur in an assembled condition.

The rear triangular portion of frame body 2 comprises seat tube 18, a pair of seatstays 19 and a pair of chainstays 20. The back ends of seatstays 19 and chainstays 20 are connected by rear dropout portions 30 (FIG. 3), and rear wheel 5r is mounted to these rear dropout portions 30. As shown in FIGS. 3 and 4, the right side rear dropout portion 30 includes a mounting slot 30a and a screw hole 30b. Mounting slot 30a typically is formed sloping diagonally upward from the bottom of rear dropout portion 30, and screw hole 30b typically is formed at the end of a projecting portion that projects diagonally downward from the back of rear dropout portion 30. Mounting slot 30a is used for installing the hub axle 29a of a rear hub 29 of rear wheel 5r, and screw hole 30b is used for mounting a derailleur 27. In order to prevent damage or deformation to other components of frame body 2, rear dropout portions 30 may be less rigid than other components and may be designed to be replaceable if damaged.

Drive portion 7 has a chain 10 and front and rear external gearshift devices 11 and 12. Front external gearshift device 11 is disposed at a bottom bracket portion of seat tube 18, and it includes a gear crank 25 and a front derailleur 26. Gear crank 25 may have a plurality of (e.g., three) sprockets with different numbers of teeth. Front derailleur 26 is operatively coupled to one of the shift control devices 23 through a shift cable assembly in the form of a Bowden cable (not shown), and front derailleur 26 engages the chain 10 with one of the three sprockets disposed on gear crank 5 in response to the operation of that shift control device 23.

Figure 2:
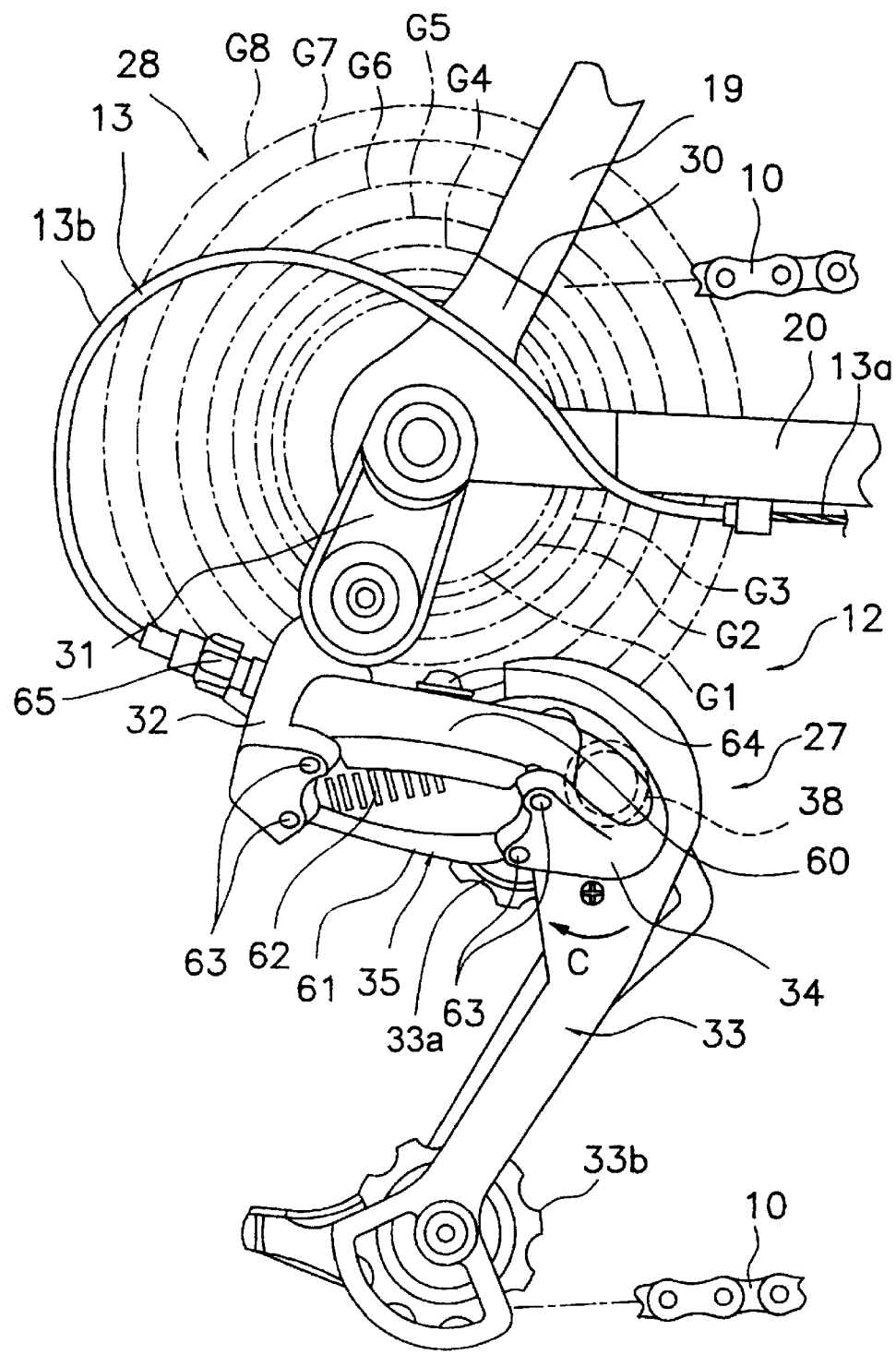
FIG. 2 is a more detailed side view of the rear derailleur.

As shown in FIGS. 1, 2 and 4, rear external gearshift device 12 has rear derailleur 27 and a gear cluster 28 comprising a plurality of (e.g., eight) sprockets G1–G8 with different numbers of teeth mounted on the rear hub 29. Rear derailleur 27 is operatively coupled to one of the shift control devices 23 through a shift cable assembly 13 in the form of a Bowden cable, and rear derailleur 27 engages the chain 10 with one of the sprockets G1–G8 in response to the operation of that shift control device 23.

As shown in FIGS. 2–6, rear derailleur 27 is detachably installed onto the right side rear dropout portion 30. The assembly comprises a bracket 31 fastened to the rear dropout portion 30, a base member 32 rotatably mounted on bracket 31, a chain guide 33, a movable member 34, a coupling mechanism in the form of a link mechanism 35, and first and second rotation restricting mechanisms 36 and 37 for restricting the rotational movement of base member 32 in both rotational directions.

Bracket 31 is detachably fastened by means of a hub axle 29a of rear wheel 5r disposed in the mounting slot 30a of rear dropout portion 30. Bracket 31 comprises a first bracket body 40 and a second bracket body 41, wherein second bracket body 41 is attached to first bracket body 40 by means of a screw 52. Brackets bodies 40 and 41 have first and second upper mounting portions 40a and 41a and first and second lower mounting portions 40b and 41b. First and second upper mounting portions 40a and 41a contact each other and are arranged to be disposed at mounting slot 30a, whereas first and second lower mounting portions 40b and 41b are spaced apart from each other for receiving base member 32 therebetween.

As shown in FIGS. 3 and 4, first bracket body 40 is a plate shaped member. Upper mounting portion 40a has a through-hole 40c for receiving hub axle 29a therethrough, a turnstop projection 40d formed on the surface facing dropout portion 30 for engaging mounting slot 30a, and a positioning projection 40e formed on the opposite surface for engaging second bracket body 41. Turnstop projection 40d is formed at the perimeter of through-hole 40c, and it has a width slightly smaller than the width of mounting slot 30a. Turnstop projection 40d prevents bracket 31 from turning when bracket 31 is mounted to rear dropout portion 30 through hub axle 29a. Positioning projection 40e is used to set the position of bracket bodies 40 and 41 relative to each other.

Second bracket body 41 has a stepped cross-sectional configuration such that second lower mounting portion 41b is laterally offset from second upper mounting portion 41a to form with the first lower mounting portion 40b of first bracket body 40 the space to receive base member 32 therein. Second upper mounting portion 41a includes a through-hole 41c and a positioning recess 41d facing the first upper mounting portion 40a of first bracket body. Through-hole 41c receives hub axle 29a therethrough, and positioning recess 41d mates with positioning projection 40e formed on the first upper mounting portion of first bracket body 40.

First lower mounting portion 40b of first bracket body 40 includes a screw hole 40f, and second lower mounting portion 41b includes a stepped through-hole 41e. A mounting shaft 50 having a head 50a with a hexagonal opening, a threaded portion 50b and a clip groove 50c for mounting an E-clip 58 passes through through-hole 41e and screws into screw hole 40f. Mounting shaft 50 fastens bracket bodies 40 and 41 together and rotatably supports base member 32 in a manner described below. A flat restricting face 40g is formed on the outer peripheral surface of the first lower mounting portion 40b of first bracket body 40 to determine the rotational position of base member 32 relative to bracket 31.

Base member 32 has a tubular boss portion 32a rotatably supported on mounting shaft 50; an arm portion 32b extending radially outwardly from boss portion 32; a first rotation restricting projection 36a, which forms part of a first rotation restricting mechanism 36; and a second rotation restricting projection 37a, which forms part of a second rotation restricting mechanism 37. First rotation restricting mechanism 36 restricts rotational movement of base member 32 in the counterclockwise direction (direction of arrow B in FIG. 5), while second rotation restricting mechanism 37 restricts rotational movement of base member 32 in the clockwise direction (direction of arrow A in FIG. 5). A pair of link support portions 32c are formed at the distal end of arm portion 32b for installing link mechanism 35. An annular projection 32d is formed at a laterally outer location on the inner peripheral surface of boss portion 32a for swage-mounting a generally tubular bearing bushing 51. A tubular reinforcing member 53 is disposed between mounting shaft 50 and bearing bushing 51 for reinforcing bracket 31. Reinforcing member 53 has a first end abutting a laterally inner location of second lower mounting portion 41b and a second end abutting the E-clip 58 mounted in the clip groove 50c formed in mounting shaft 50. As a result, even if the outside face of second lower mounting portion 41b should bump into a rock or tree, thereby subjecting the second mounting portion 41b to an outside force, that force will be received by reinforcing member 53, this making the second lower mounting portion 41b resistant to deformation. Reinforcing member 53 also isolates base member 32 from such forces, so it is possible also to reduce the likelihood of deformation of or damage to the base member 32.

A stopper plate 54 is disposed between E clip 58 and a laterally inner location of boss portion 32a. Stopper plate 54 may be fabricated by press molding sheet metal, and it comprises a disk portion 54a and first and second projections 54b and 54c. Disk portion 54a has a stepped cross-sectional shape, and first and second projections 54b and 54c extend diametrically outward from disk portion 54a and bend in mutually opposite lateral directions. Reinforcing member 53 extends through a central opening formed in disk portion 54a. First projection 54b is formed such that it can be juxtaposed with the restricting face 40g formed on the first bracket body 40, and an adjusting screw 59 is screwed into this first projection 54b with the distal end of adjusting screw 59 contacting restricting face 40g. The rotational position of stopper plate 54, and hence base member 32, relative to bracket 31 may be adjusted by turning adjusting screw 59. Second projection 54*c* is formed such that it can be juxtaposed (e.g., abut) with second rotation restricting projection 37*a* formed on base member 32.

A torsion coil spring 55 is mounted within boss portion 32*a* of base member 32 such that a first end of spring 55 is detained in a spring detent hole 32*e* formed in projection 32*d* and the other end of spring 55 is detained in a spring detent hole 54*d* formed in stopper plate 54. Spring 55 biases stopper plate 54 counterclockwise so that second projection 54*c* of stopper plate 54 abuts against second rotation restricting projection 37*a*. An O-ring 56 is mounted between the projection 32*d* of boss portion 32*a* and the second lower mounting portion 41*b* of second bracket body 41 for preventing liquids or foreign matter from penetrating into the cavity containing spring 55. A disk-shaped seal ring 57 is mounted between boss portion 32*a* and stopper plate 54 for the same purpose.

Figure 5:
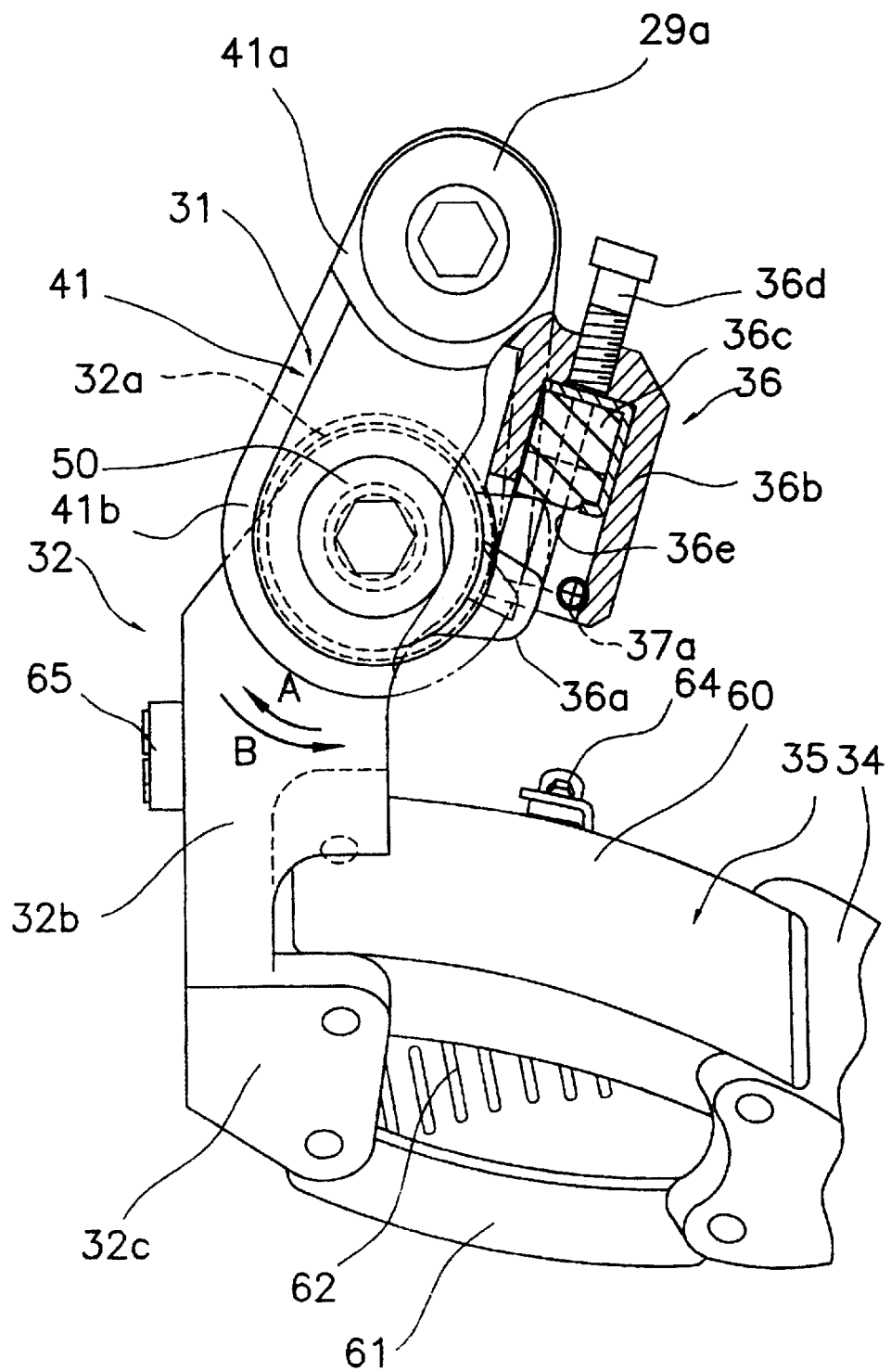
FIG. 5 is a partial cross sectional view of shock absorbing components for the rear derailleur.
Figure 6:
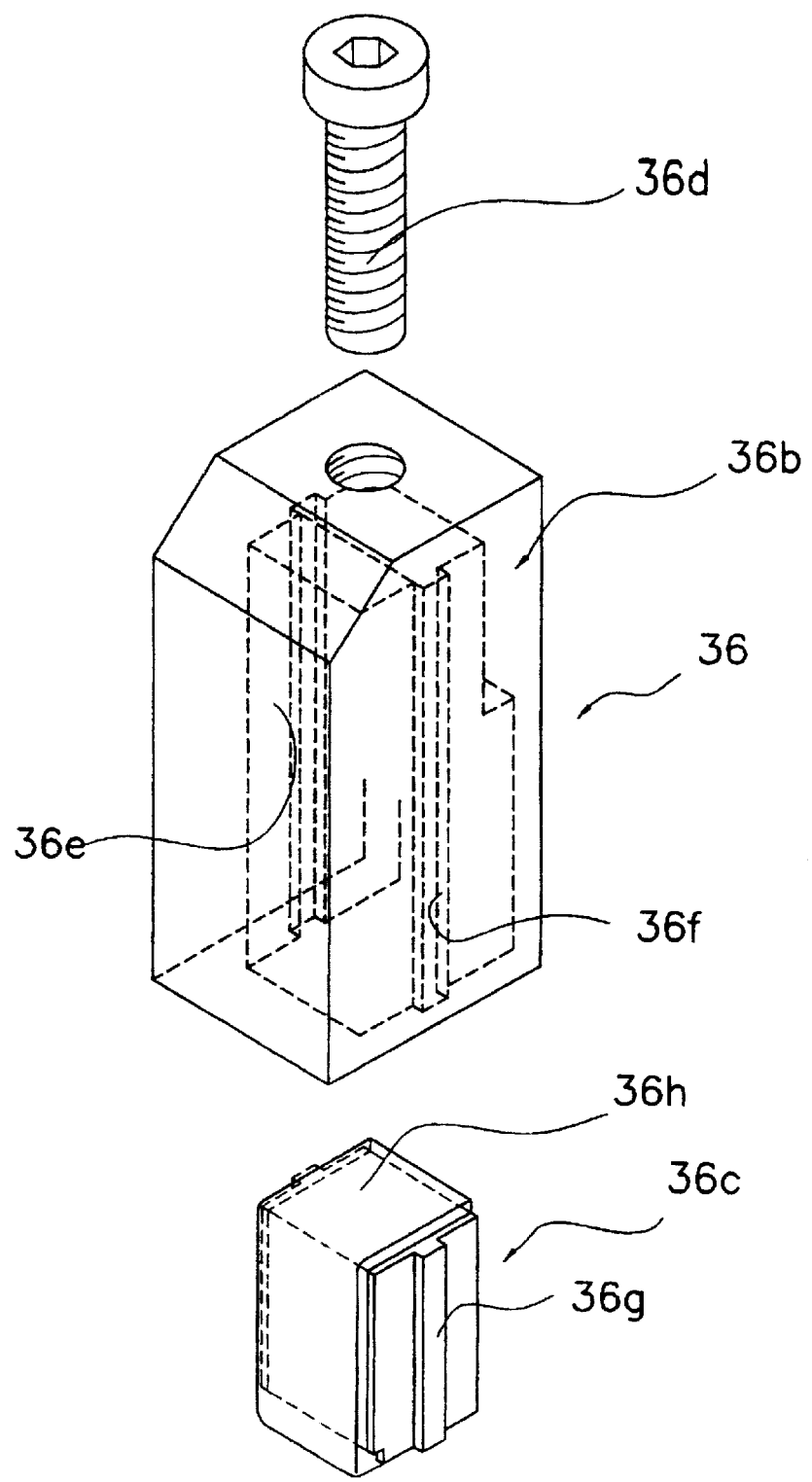
FIG. 6 is an exploded view of the shock absorbing components.

As shown in FIGS. 3, 5 and 6, first rotation restricting mechanism 36 comprises the first restricting projection 36*a* on base member 32, a guide portion 36*b* integrally formed with second bracket body 41, a shock absorber 36*c* disposed in guide portion 36*b*, and an adjusting bolt 36*d* provided for adjusting the position of shock absorber 36*c*. Shock absorber 36*c* may be formed from a resilient material such as synthetic rubber, for example. Guide portion 36*b* has a generally rectangular shape and forms an internal rectangular guide space 36*e* with a guide grooves 36*f* on a pair of opposite walls. Shock absorber 36*c* has a pair of guide projections 36*g* on opposite walls for mating with guide grooves 36*f*. Cushion member 36*c* is retained within guide space 36*e* by a generally C-shaped metal retaining member 36*h*.

To use first rotation restricting mechanism 36, the adjusting bolt 36*d* is turned at a time when chain guide 33 and movable member 34 are not in contact with the chainstays 20 until first restricting projection 36*a* abuts cushion member 36*c*. As a result, first rotation restricting mechanism 36 restricts the rotational movement of base member 32 so that the chain guide 33 and moving member 34 do not contact the chainstays 20, even if base member 32 rotates counterclockwise.

Second rotation restricting mechanism 37 restricts rotational movement of base member 32 in the clockwise direction, the second restricting projection 37*a* on base member 32 and the second projection 54*c* on stopper plate 54. In the absence of tension on chain 10, stopper plate 54 turns counterclockwise under the biasing force of tension coil spring 55 until second restricting projection 37*a* abuts against second projection 54*c*, thus setting the rotational position of base member 32 relative to stopper plate 54.

Chain guide 33 includes a pair of pulleys 33*a* and 33*b*, wherein chain 10 wraps around the front portion of pulley 33*a* and around the rear portion of pulley 33*b*. Chain guide 33 guides chain 10 onto selected ones of the plurality of sprockets G1–G8. Chain guide 33 is coupled to movable member 34 for pivoting around an axis substantially parallel to the hub axle 29*a* of rear hub 29. A coil spring 38 is installed between chain guide 33 and movable member 34 for biasing chain guide 33 clockwise (the direction of arrow C in FIG. 2) when viewed from the laterally outside. Such biasing, in conjunction with the clockwise bias of base member 32, imparts tension to the chain 10 so that chain 10 resists coming off of the gear cluster 28. Also, since base member 32 and chain guide 33 pivot during gearshift operations, the path of motion of chain guide 33 readily conforms to the radial profile of sprockets G1–G8 so that chain 10 may be guided smoothly onto any of the sprockets G1–G8.

Link mechanism 35 couples movable member 34 to base member 32 so that movable member 34 can move relative to base member 32. As shown in FIG. 2, link mechanism 35 comprises first and second link members 60 and 61 mounted at their first ends through a pair of pivot shafts 63 to a link support 32*c* disposed at the lower portion of base member 32. The second ends of first and second link members 60 and 61 are mounted to movable member 34 through another pair of pivot shafts 63. A coil spring 62 is connected to a pair of the pivot shafts 63 situated at opposite corners so that first and second link members 60 and 61 bias movable member 34 and chain guide 33 towards the large diameter sprocket G8. An inner wire mounting unit 64 is disposed at a side face of second link member 61 for fastening the inner wire 13*a* of shift cable assembly 13, and an outer casing mounting unit 65 is disposed on base member 32 in close proximity to boss portion 32*a* for fastening the outer casing 13*b* of shift cable assembly 13.

When riding the bicycle, the rear derailleur 27 may be operated by operating the corresponding shift control unit 23 to select an appropriate gear ratio in response to a change in riding conditions. Operating the shift control unit 23 causes the inner wire 13*a* to be pulled and released relative to the outer casing 13*b*, and the movement of inner wire 13*a* is transmitted to the first link member 60 via the inner wire mounting unit 64. The combination of the biasing force of spring 62 and the pulling and releasing force of inner wire 13*a* cause the first and second link members 60 and 61 to pivot around pivot shafts 63, chain guide 33 and base member 62 rotate to appropriate positions in accordance with the biasing force of springs 38 and 55, chain guide moves in the direction of the hub axle 29*a*, and chain 10 is guided by pulleys 33*a* and 33*b* onto the desired sprocket.

It is possible that the bracket 31 or base member 32 may bump into a rock, tree, or the like during riding. However, since the base member 32 of derailleur 27 in this embodiment is supported at two lateral sides by bracket 31, bracket 31 and base member 32 are very rigid and resist damage and deformation. Additionally, since the bracket 31 is also fastened to hub axle 29, which is more rigid than the distal ends of rear dropout portions 30, rear dropout portions 30 also are more resistant to damage and deformation. At the same time, the first rotation restricting mechanism 36 restricts counterclockwise rotation of base member 32, thus making it difficult for chain guide 33 to come into contact with the chainstays 20. Thus, damage and deformation of rear derailleur 27 can be avoided when traveling over rough terrain such as mountainous areas or other areas with dips and rises or obstacles.

Figure 7:
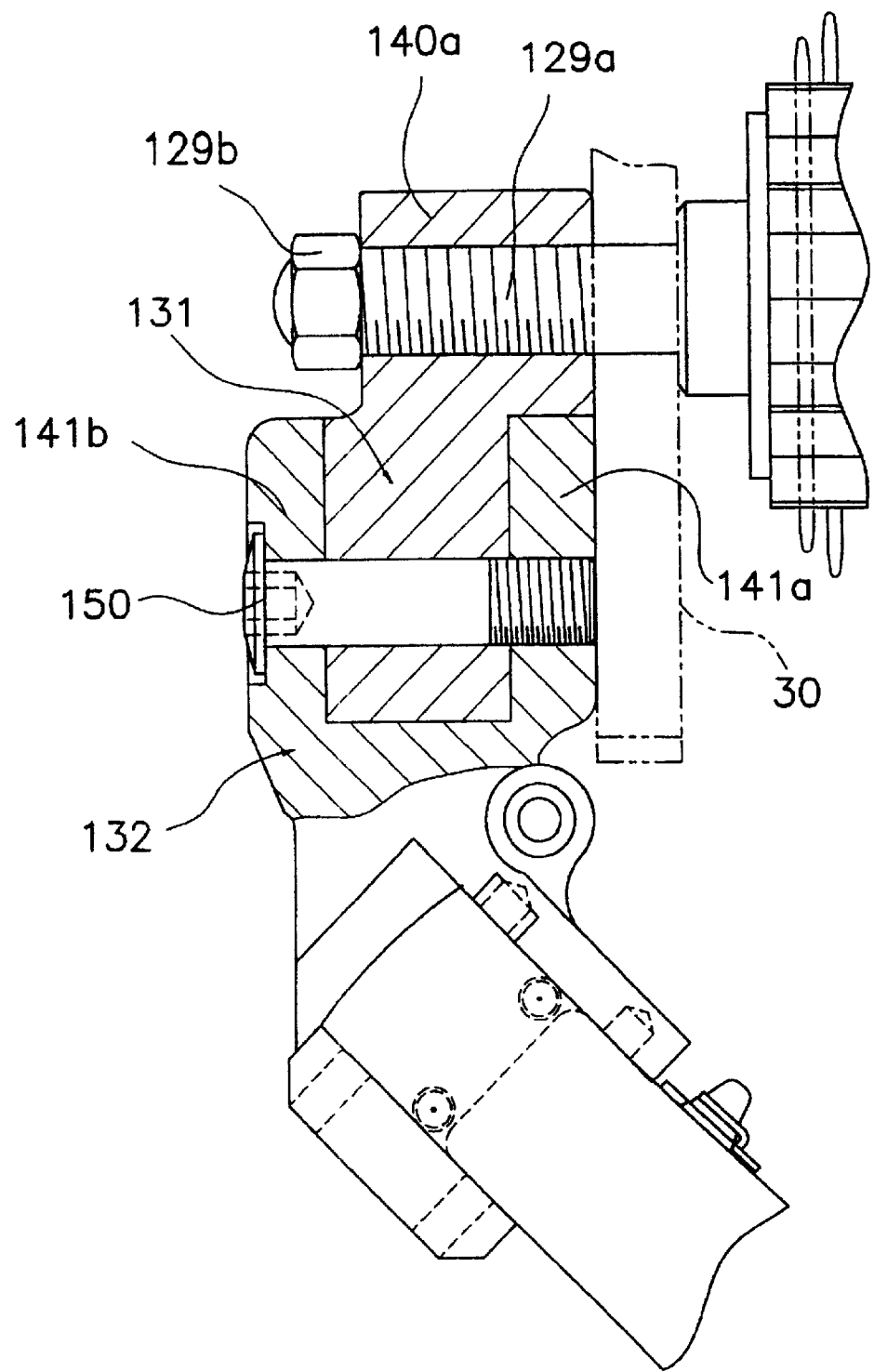
FIG. 7 is a partial cross sectional view of the components near the base member of an alternative embodiment of a rear derailleur in an assembled condition.

In the above embodiment, base member 32 is supported at opposite lateral sides by bracket 31. Alternatively, as shown in FIG. 7, a base member 132 could support the opposite lateral sides of a bracket 131. In this embodiment, a mounting portion 140*a* of bracket 131 is fastened to hub axle 129*a* by means of a nut 129*b*, and a mounting shaft 150 extends between first and second mounting portions 141*a* and 141*b* of base member 132 to nonrotatably fasten base member 132 to bracket 131. The advantages of this embodiment are similar to those of the embodiment described above in that, since the base member 132 is fastened to the bracket 131, the components are more resistant to damage and deformation.

Figure 8:
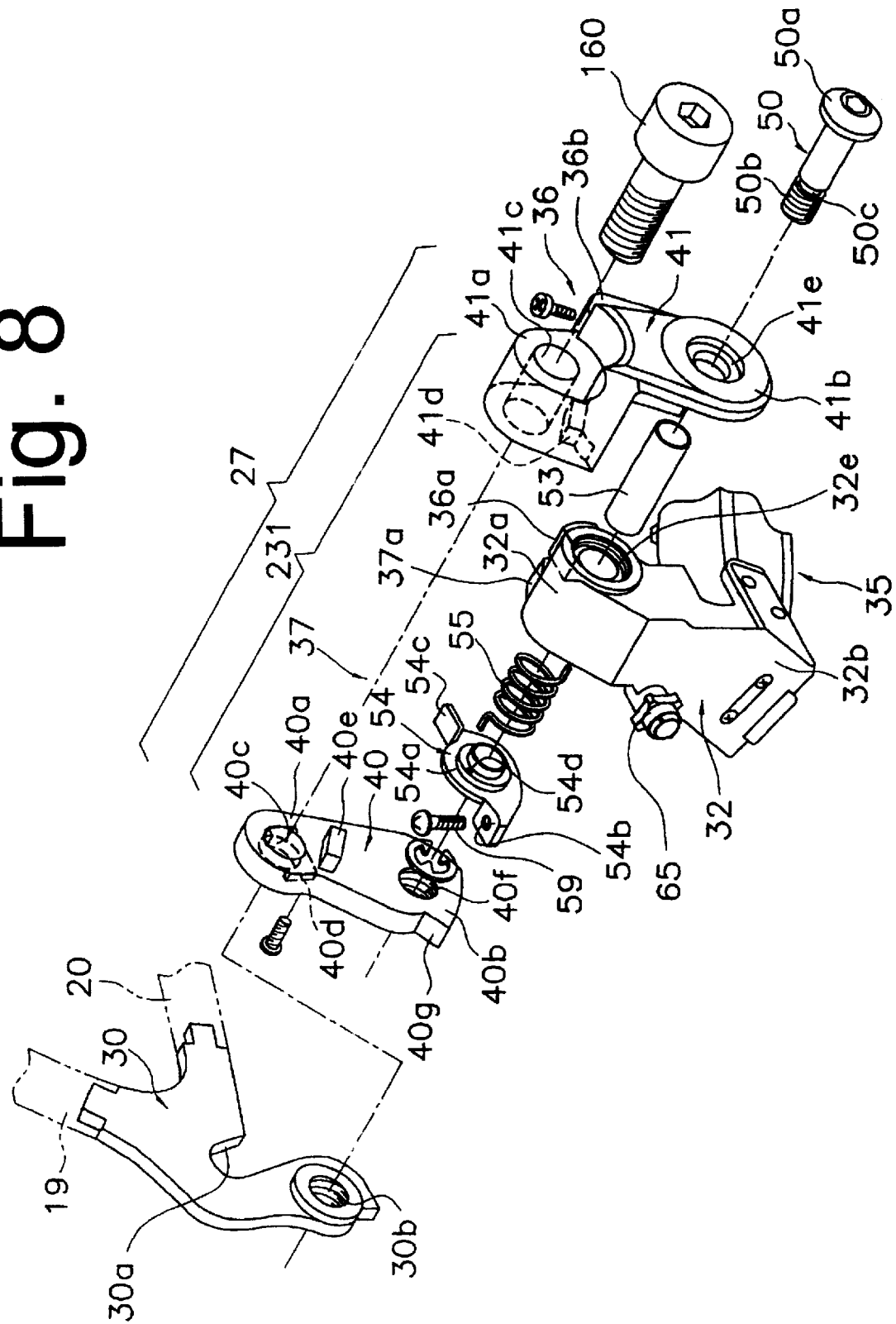
FIG. 8 is an exploded view of relevant components of another alternative embodiment of a rear derailleur near the base member of the rear derailleur.

In the embodiments described above, bracket 31 or 131 is fastened to hub axle 29*a* or 129*a*, respectively. Alternatively, as shown in FIG. 8, a bracket 231 could be nonrotatably fastened to rear dropout portion 30 by a fastening bolt 160 screwed into a screw hole 30b formed in rear dropout portion 30.

Figure 9:
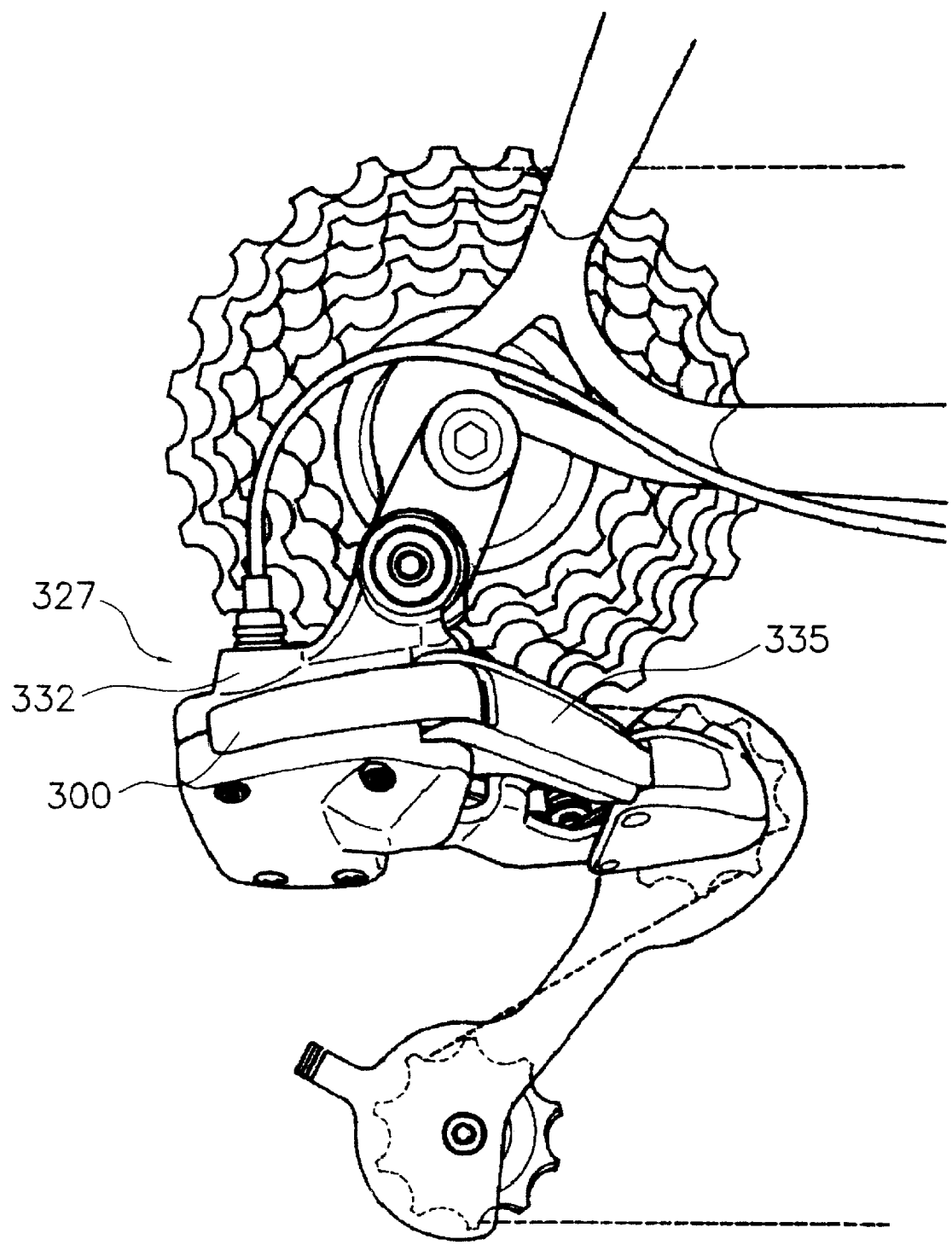
FIG. 9 is a more detailed view of another alternative embodiment of a rear derailleur.

In the embodiments described above, the rear derailleur was operated by a shift cable assembly 13. Alternatively, as shown in FIG. 9, a rear derailleur 327 may be provided wherein movement of a link mechanism 335 is performed by an automatic positioning actuator 300 disposed on a base member 332. Automatic positioning actuator 300 positions a link mechanism 335 in a plurality of discrete positions. Since the automatic positioning actuator 300 is disposed on base member 332, it may move the link mechanism 335 directly, thus eliminating possible inaccuracies caused by stretching of the inner wire of a conventional shift cable assembly.

Figure 10:
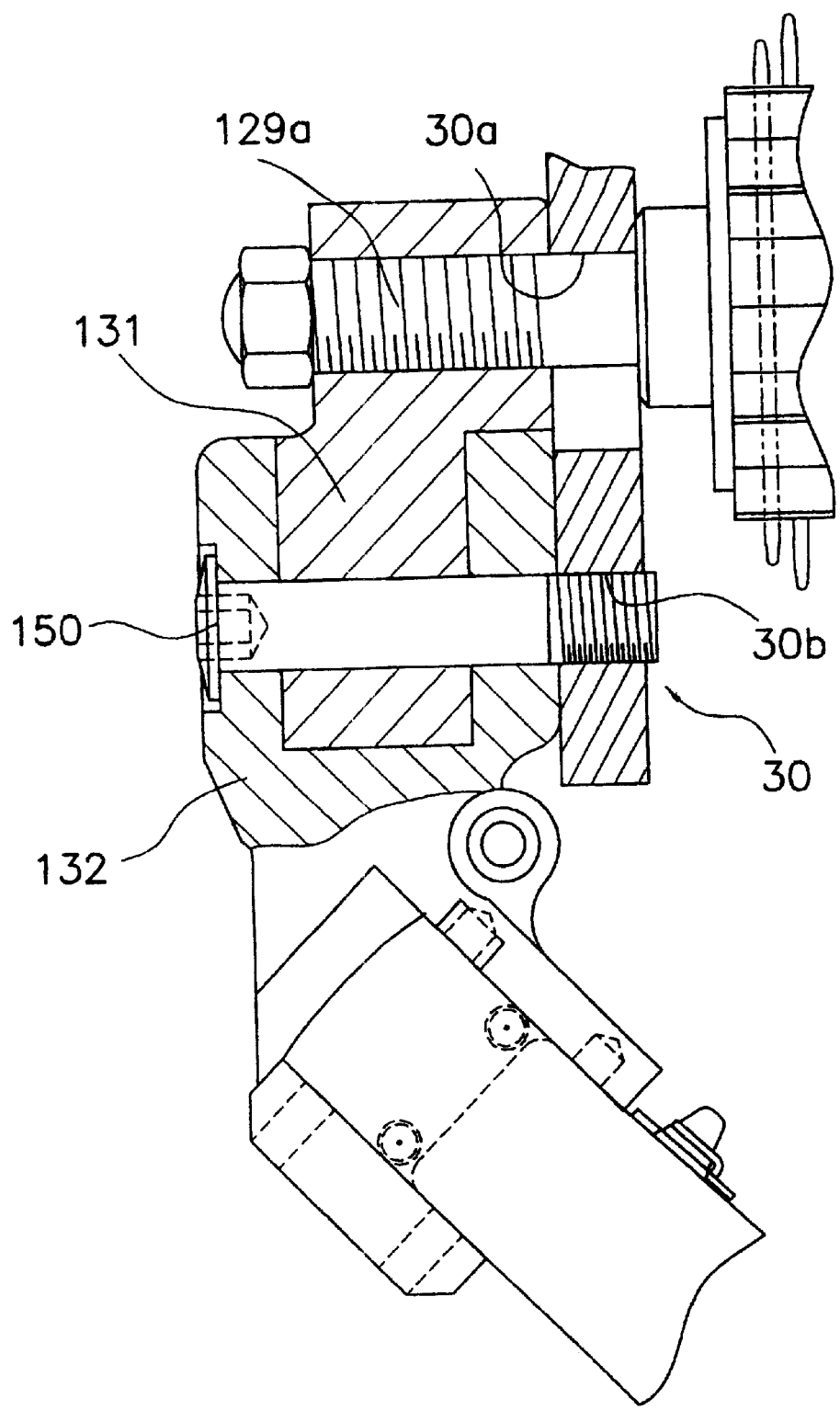
FIG. 10 is a partial cross sectional view of the components near the base member of another alternative embodiment of a rear derailleur in an assembled condition.

In the embodiments described above, a mounting shaft 50 or 150 is screwed into a first mounting portion 40b or 141a. Alternatively, as shown in FIG. 10, a mounting shaft 150 could be screwed into a screw hole 30b in rear dropout portion 30. In this embodiment, the general derailleur position can be set reliably by fastening the assembly using two structures (i.e., hub axle 129a and mounting shaft 150), and a turnstop projection is not needed. Additionally, the bracket 131 mounted on hub axle 129a and the base member 132 fastened in screw hole 30b provide more secure fastening to the rear dropout portion 30. While FIG. 10 shows base member 132 straddling bracket 131, the bracket could straddle the base member in a manner similar to the embodiment shown in FIGS. 3 and 4.

Figure 11:
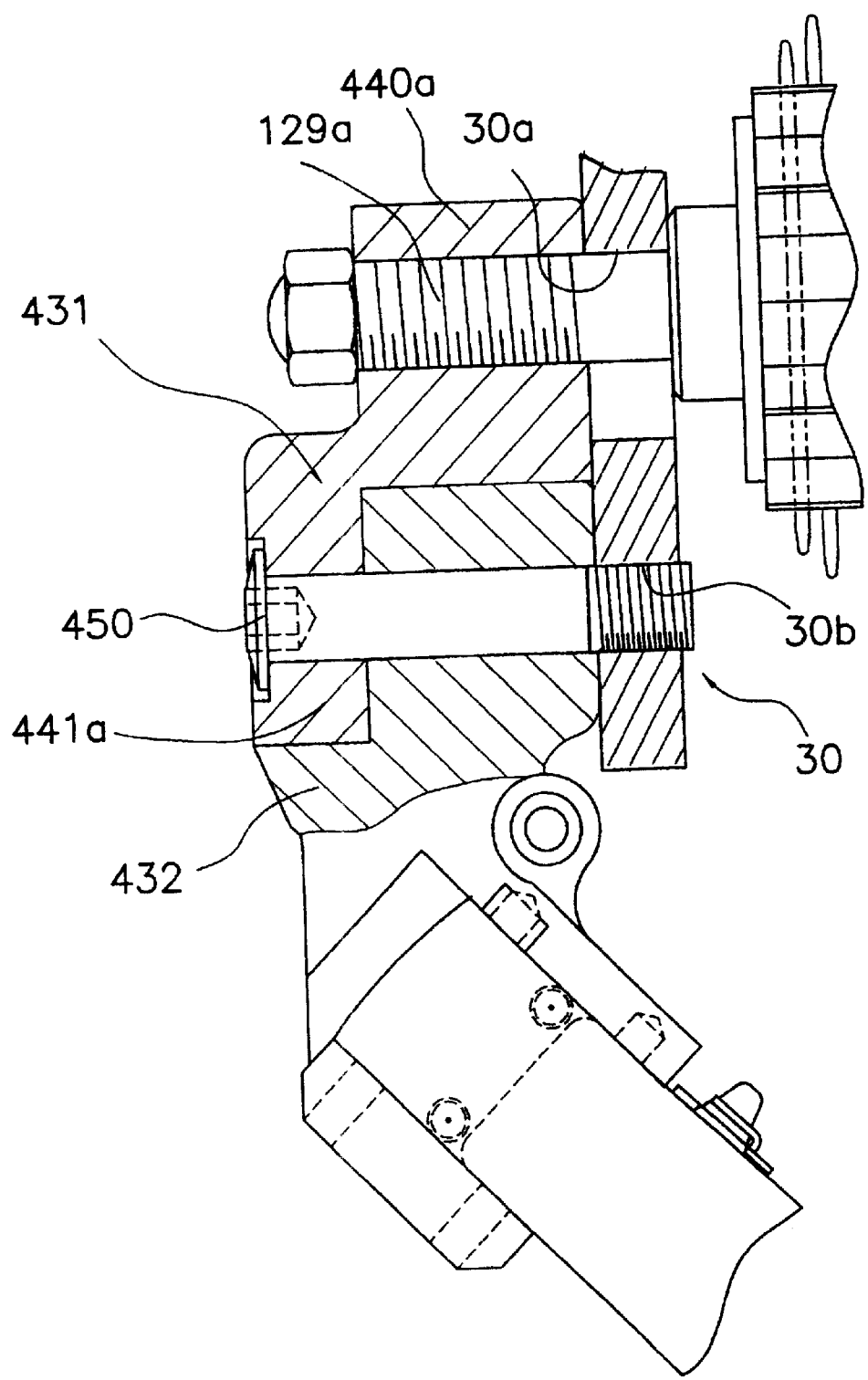
FIG. 11 is a partial cross sectional view of the components near the base member of another alternative embodiment of a rear derailleur in an assembled condition.

In the embodiments described above, either the base member or the bracket is straddled by the other. Alternatively, as shown in FIG. 11, the rear dropout portion 30 and a bracket 431 could straddle a base member 432. In this embodiment, an upper mounting portion 440a of bracket 431 is fastened to the hub axle 129a, and a mounting shaft 450 extends through a lower mounting portion 441a of bracket 431 and through base member 432, and then screws into a screw hole 30b in rear dropout portion 30. In this embodiment as well, the general derailleur position can be set reliably by fastening the assembly using two structures (i.e., hub axle 129a and mounting shaft 450), and a turnstop projection is not needed. Additionally, the bracket 431 mounted on hub axle 129a and the bracket 431 and base member 432 fastened in screw hole 30b provide more secure fastening to the rear dropout portion 30. While FIG. 11 shows base member 432 straddled by bracket 431 and rear dropout portion 30, the bracket could be straddled by the base member and the rear dropout portion.

While the above is a description of various embodiments of inventive features, even further modifications may be employed without departing from the spirit and scope of the present invention. For example, the cushion member 36c of first swivel restricting mechanism 36 of the first described embodiment may be adjusted using adjusting bolt 36d to adjust the rotational position restriction of the chain guide 33 and movable member 34, but adjusting bolt 36d may be omitted so that the rotational position restriction is fixed.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A bicycle derailleur adapted to be mounted to a bicycle frame, wherein the derailleur comprises:
   a bracket adapted to be mounted to the frame;
   a base member supported by the bracket;
   a chain guide;
   a coupling mechanism coupled between the base member and the chain guide so that the chain guide moves laterally relative to the base member; and
   wherein the base member is supported at first and second lateral locations, and wherein the bracket supports at least one of the first and second lateral locations of the base member.

2. The derailleur according to claim 1 wherein the first and second lateral locations of the base member are opposite to each other.

3. The derailleur according to claim 1 wherein the bracket supports the first and second lateral locations of the base member.

4. The derailleur according to claim 3 wherein the first and second lateral locations of the base member are opposite to each other.

5. The derailleur according to claim 4 wherein the bracket straddles the first and second lateral locations of the base member.

6. The derailleur according to claim 5 wherein the first and second lateral locations of the base member face away from each other.

7. The derailleur according to claim 6 wherein the bracket comprises:
   a first mounting portion facing the first lateral location of the base member; and
   a second mounting portion facing the second lateral location of the base member; and
   wherein the base member is mounted on a mounting shaft that extends between the first mounting portion of the bracket and the second mounting portion of the bracket.

8. The derailleur according to claim 7 wherein the bracket comprises:
   a first member having the first mounting portion; and
   a second member having the second mounting portion.

9. The derailleur according to claim 6 further comprising a tubular reinforcing member disposed around the mounting shaft, wherein the tubular reinforcing member has a first end face that faces the first mounting portion of the bracket and a second end face that faces the second mounting portion of the bracket.

10. The derailleur according to claim 4 wherein the first and second lateral locations of the base member straddle the bracket.

11. The derailleur according to claim 10 wherein the base member comprises:
   a first mounting portion facing a first lateral location of the bracket; and
   a second mounting portion facing a second lateral location of the bracket; and
   wherein the bracket is mounted on a mounting shaft that extends between the first mounting portion of the base member and the second mounting portion of the base member.

12. The derailleur according to claim 11 wherein the first and second lateral locations of the base member face towards each other.

13. The derailleur according to claim 1 wherein the bracket is located at the first lateral location of the base member, and wherein the second lateral location of the base member is adapted to be supported by the bicycle frame.

14. The derailleur according to claim 1 wherein the bracket is adapted to be mounted by a fastener to the frame.

15. The derailleur according to claim 14 wherein the fastener is adapted to mount the bracket to a wheel hub axle.

16. The derailleur according to claim 1 further comprising a turnstop projection adapted to engage the bracket with a mounting recess formed in the frame.

17. The derailleur according to claim 1 wherein the coupling mechanism comprises a link mechanism adapted to be connected to a shift cable assembly so that the link mechanism moves in response to movement of the shift cable.

18. The derailleur according to claim 17 wherein the shift cable assembly comprises an inner wire that slides within an outer casing, and wherein the coupling mechanism comprises:
a first link member having a first end and a second end;
a second link member having a first end and a second end;
wherein the first end of the first link member is pivotably coupled to the base member;
wherein the first end of the second link member is pivotably coupled to the base member;
an inner wire mounting unit disposed one of the first and second link members for mounting the inner wire of the shift cable assembly;
a movable member supporting the chain guide;
wherein the second end of the first link member is pivotably coupled to the movable member;
wherein the second end of the second link member is pivotably coupled to the movable member; and
a biasing member that biases the movable member relative to the base member.

19. The derailleur according to claim 18 further comprising an outer casing mounting unit disposed on the base member for mounting the outer casing of the shift cable assembly.

20. The derailleur according to claim 1 further comprising a positioning actuator mechanism disposed on the base member for moving the chain guide relative to the base member.

21. The derailleur according to claim 1 wherein the chain guide pivots around a first axis, and wherein the base member is coupled to the bracket so that the base member pivots around a second axis substantially parallel to the first axis.

22. The derailleur according to claim 21 further comprising a biasing mechanism that biases the base member relative to the bracket in one of a clockwise and a counterclockwise direction when viewed laterally outwardly from the base member.

23. The derailleur according to claim 22 further comprising a rotation restriction mechanism that restricts rotation of the base member in the other one of the clockwise and counterclockwise directions.

24. The derailleur according to claim 23 wherein the rotation restriction mechanism comprises a shock absorber.

25. The derailleur according to claim 1 wherein the base member is nonrotatably coupled relative to the bracket.

26. The derailleur according to claim 1 further comprising a mounting shaft adapted to mount the base member to the frame at a location different from a wheel hub axle.

27. A bracket for a rear derailleur that includes a base member, a chain guide, and a coupling mechanism coupled between the base member and the chain guide so that the chain guide moves laterally relative to the base member, wherein the bracket comprises:
a first bracket body comprising:
a first upper mounting portion structured to attach to a rear dropout portion of a bicycle frame; and
a first lower mounting portion structured to extend over a first lateral side location of the rear derailleur when the first upper mounting portion is attached to the rear dropout portion;
wherein a laterally inner surface of the first lower mounting portion is structured to support a laterally outer surface of the base member.

28. The bracket according to claim 27 wherein the first upper mounting portion includes an opening structured to receive a wheel hub axle therethrough.

29. The bracket according to claim 27 wherein the first upper mounting portion is laterally offset from the first lower mounting portion.

30. The bracket according to claim 27 wherein the laterally inner surface of the first lower mounting portion faces toward the laterally outer surface of the base member.

31. A bracket for a rear derailleur that includes a base member, a chain guide, and a coupling mechanism coupled between the base member and the chain guide so that the chain guide moves laterally relative to the base member, wherein the bracket comprises:
a first bracket body comprising:
a first upper mounting portion structured to attach to a rear dropout portion of a bicycle frame; and
a first lower mounting portion structured to extend over a first lateral side location of the rear derailleur when the first upper mounting portion is attached to the rear dropout portion; and
a second bracket body comprising:
a second upper mounting portion structured to attach to the rear dropout portion of the bicycle frame; and
a second lower mounting portion structured to extend over a second lateral side location of the rear derailleur when the second upper mounting portion is attached to the rear dropout portion.

32. The bracket according to claim 31 wherein the first bracket body is separate from the second bracket body.

33. The bracket according to claim 31 wherein the first lower mounting portion is spaced apart from the second lower mounting portion.

34. The bracket according to claim 33 wherein the first lower mounting portion is spaced apart from the second lower mounting portion sufficient to receive the base member of the derailleur therein.

35. The bracket according to claim 33 wherein the first and second upper mounting portions each includes an opening structured to receive a wheel hub axle therethrough.

36. The bracket according to claim 33 wherein the first and second upper mounting portions each includes an opening structured to receive a fastener therethrough for attaching the first and second bracket bodies to the rear dropout portion of the bicycle frame at a location offset from a wheel hub axle.

37. The bracket according to claim 33 wherein the first upper mounting portion is laterally offset from the first lower mounting portion.

38. The bracket according to claim 33 wherein the first upper mounting portion faces the second upper mounting portion, and wherein the first lower mounting portion faces the second lower mounting portion.

39. A bracket for a rear derailleur that includes a base member, a chain guide, and a coupling mechanism coupled between the base member and the chain guide so that the chain guide moves laterally relative to the base member, wherein the bracket comprises:

a first bracket body comprising:

a first upper mounting portion structured to attach to a rear dropout portion of a bicycle frame; and a first lower mounting portion structured to extend over a first lateral side location of the rear derailleur when the first upper mounting portion is attached to the rear dropout portion;

wherein the first upper mounting portion includes an opening structured to receive a fastener therethrough for attaching the first bracket body to the rear dropout portion of the bicycle frame at a location offset from a wheel hub axle.

* * * * *